March 25, 1947.  G. FRANKLIN  2,417,976
FLOAT VALVE FOR AIR FILTERS
Filed July 29, 1944
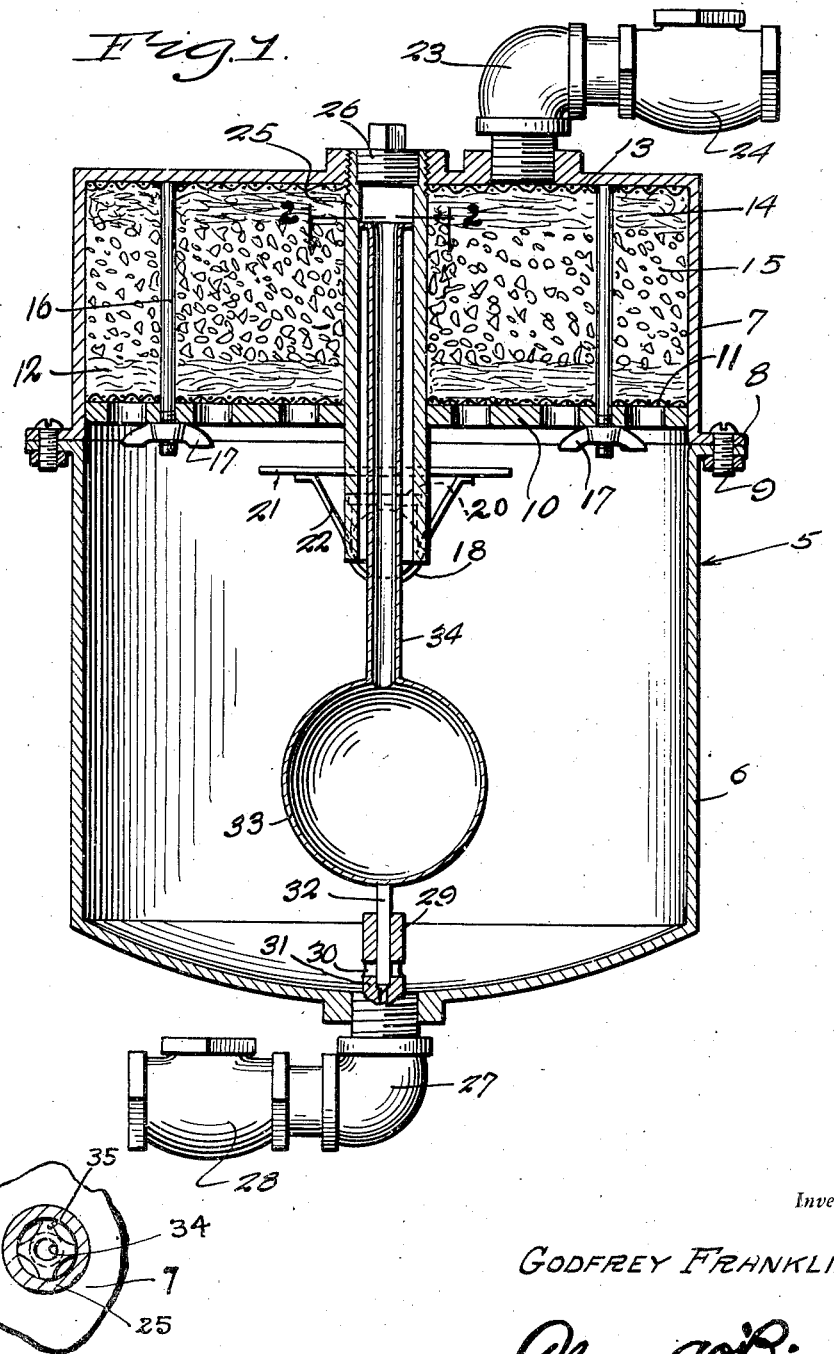
Inventor
GODFREY FRANKLIN,
By Clarence A. O'Brien
and Harvey B. Jacobson
Attorneys Patented Mar. 25, 1947

2,417,976

UNITED STATES PATENT OFFICE 2,417,976

FLOAT VALVE FOR AIR FILTERS

Godfrey Franklin, Vallejo, Calif.

Application July 29, 1944, Serial No. 547,156

1 Claim. (Cl. 137—68)

The present invention relates to new and useful improvements in float valves for air filters designed for removing moisture from air whereby to produce dry air for use in various types of air machinery.

An important object of the present invention is to provide in an air filter including a tank in which the moisture is collected float controlled means providing for the drainage of the water from the tank with the float vented to the interior of the tank.

A further object of the invention is to provide means of the character indicated of simple and practical construction, which is efficient and reliable in performance, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which—

Figure 1 is a vertical sectional view through the filter.

Figure 2 is a fragmentary sectional view taken substantially on a line 2—2 of Figure 1.

Referring now to the drawings in detail wherein for the purpose of illustration I have disclosed a preferred embodiment of the invention, the numeral 5 designates a tank generally which includes a bottom portion 6 and top portion or section 7, the abutting edges of the sections 6 and 7 being formed with flanges 8 for connecting the sections in air-tight engagement by bolts 9.

A filtering element is positioned in the upper section 7 and includes a lower perforated copper plate 10 above which is positioned a copper screen 11 and above the latter is placed a layer of absorbent cotton 12. Against the top of the upper section 7 is placed a copper screen 13 below which is positioned a layer of absorbent cotton 14 and between the layers of cotton 12 and 14 is placed a quantity of charcoal 15. Studs 16 project downwardly from the top of the upper section 7 through the filtering elements 11, 12, 13 and 14 and 15, and also through the lower copper plate 10, the lower ends of the studs being provided with wing nuts 17 by means of which the filtering elements may be compressed between the plate 10 and the top of the section 7.

A moist air inlet pipe 18 enters the side of the lower section 6 of the tank, the inner end of the pipe extends upwardly as shown at 20 for directing air against the underside of a horizontal deflector 21 supported on the inner end of the pipe 18 by means of brackets 22. The deflector 21 being disposed in slightly spaced relation above the discharge end of the pipe 18. The deflector 21 is spaced below the plate 10 of the filter so that moist air entering the tank under pressure will be distributed throughout the underside of the filter.

A dry air discharge pipe 23 is connected to the top of the upper section 7 of the tank for conveying the air to the desired air machinery, the pipe 23 also having a control valve 24 therein.

Also threaded in the top of the upper section 7 is a tube 25 having a plug 26 threaded in its upper end to close the top of the tube. The tube extends downwardly through the filter elements and downwardly through the plate 10 to a point below the discharge end of the pipe 18, the lower end of the tube being open.

A drain pipe 27 is attached to the bottom of the lower section 6 of the tank, the outer end of the pipe 27 having a pop-off valve 28 of conventional construction attached thereto and to the inner end of the pipe 27 is attached a guide 29 having a drain passage 30 therein formed with a seat 31 for a needle valve 32 projecting downwardly from the lower end of a hollow metal float 33, the float having a hollow stem 34 rising therefrom and entering the tube 25 in spaced relation from the walls of the latter. The upper end of the stem 34 is open and is provided with laterally extending tongues 35 spacing the stem from the tube.

In the operation of the device moist air entering the lower section of the tank 6 through the pipe 18 will pass upwardly through the filtering element whereby the moisture is removed from the air and the dry air exhausted through the pipe 23. Moisture removed from the air will be collected in the lower portion of the section 6 of the tank and upon reaching a predetermined level will raise the float 33 whereby to permit drainage of the moisture through the pipe 27.

Air within the tank is permitted to enter the float 33 through the tube 25 and stem 34 whereby to equalize pressure within the float to prevent collapsing thereof.

The plug 26 in the upper end of the tube 25 functions as an adjustable stop for the upper end of the stem 34 whereby to regulate the opening movement of the needle valve 32 controlled by the float 33.

It is believed that the details of construction and manner of use of the device will be readily understood from the foregoing without further detailed explanation.

Having described the invention, what is claimed as new is:

A tank adapted to collect moisture in the bottom thereof, a drain pipe in the bottom of the tank, a valve controlling said drain pipe, a float connected to the valve for operating the latter, said float being hollow, a hollow stem rising from the float, a tube extending downwardly in the tank forming a guide for the stem, said stem being spaced from the walls of the tube and open at its top to admit air from the tank into the float, and an adjustable stop in the tube for the stem to limit opening movement of the valve, said stop closing the upper end of the tube and being removable to open said end of the tube to the atmosphere.

GODFREY FRANKLIN.

REFERENCES CITED

The following references are of record in the file of this patent:

UNITED STATES PATENTS

| Number | Name | Date |
|---|---|---|
| 1,871,546 | McClafferty | Aug. 16, 1932 |
| 2,033,368 | Altgelt | Mar. 10, 1936 |
| 1,830,022 | Fourness | Nov. 3, 1931 |
| 1,895,084 | Peltier | Jan. 24, 1933 |
| 1,663,411 | Little | Mar. 20, 1928 |
| 401,701 | Grau | Apr. 16, 1889 |
| 129,885 | Dustin | July 30, 1872 |
| 1,845,129 | Coahran | Feb. 16, 1932 |

FOREIGN PATENTS

| Number | Country | Date |
|---|---|---|
| 341,918 | Italian | July 16, 1936 |